Patented Feb. 5, 1946

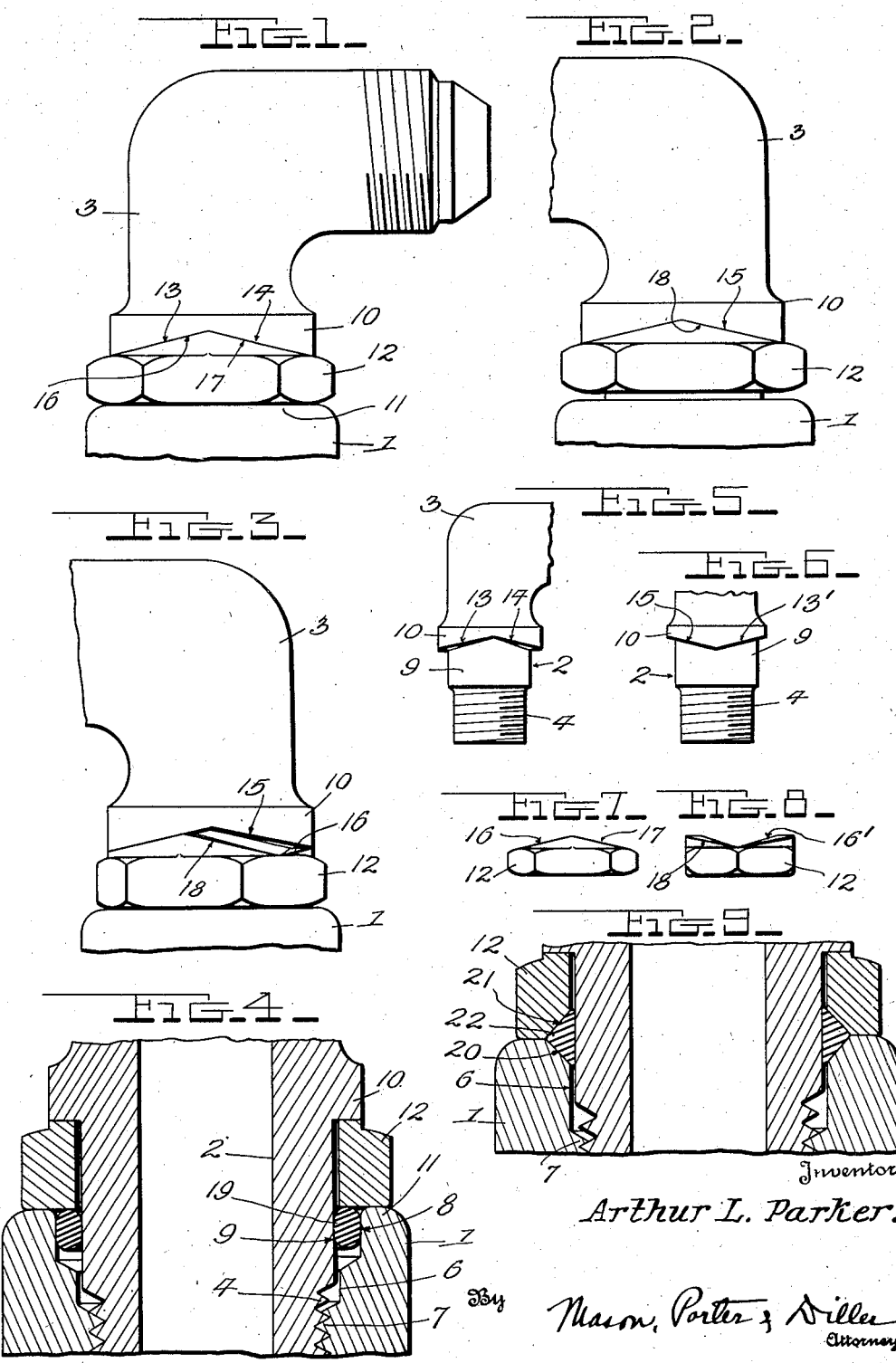

2,394,097

UNITED STATES PATENT OFFICE 2,394,097

PIPE COUPLING

Arthur L. Parker, Cleveland, Ohio, assignor to The Parker Appliance Company, Cleveland, Ohio, a corporation of Ohio Application May 18, 1944, Serial No. 536,177

2 Claims. (Cl. 285—55)

The invention relates to new and useful improvements in a pipe coupling and more particularly a coupling wherein a pipe is secured to a fixed part in a set angular position relative thereto.

An object of the invention is to provide a coupling which may be secured in a set position by a lock collar which is normally free to slide and rotate on said pipe.

A further object of the invention is to provide a coupling of the above type wherein the lock collar cooperates with the fixed part in forming a recess for a gasket which seals the connection between the parts.

A further object of the invention is to provide a coupling of the above type wherein an elastic gasket is employed and the recess and gasket are so dimensioned that the gasket seals the connection solely by the expansion thereof.

These and other objects will in part be obvious and will in part be hereinafter more fully disclosed.

In the drawing—

Figure 1 is a side elevation of a pipe coupling embodying the improvements;

Figure 2 is a fragmentary view similar to Figure 1 with the pipe and nut backed off for positioning the pipe in a desired set angular position relative to the fixed part;

Figure 3 is a view similar to Figure 2 showing the lock collar turned for locking the pipe in the set angular position;

Figure 4 is a view in longitudinal section of a portion of the coupling shown in Figures 1 to 3 with the parts in locked position;

Figure 5 is a fragmentary side view of the pipe;

Figure 6 is a fragmentary side view of the pipe as seen from a different angle;

Figure 7 is a side view of the collar;

Figure 8 is a similar view of the collar from a different angle;

Figure 9 is a view similar to Figure 4 but showing a slightly modified form of recess for the sealing gasket.

The invention has to do with a coupling for pipes and more particularly an elbow pipe which must be set in a certain angular position relative to a fixed part with which it is connected. In the drawing a boss is indicated at 1 which boss forms part of a tank to which the pipe is to be secured. This boss will be referred to hereinafter as a fixed member or part. The pipe is indicated at 2. Said pipe has an elbow section 3 which is threaded for attachment to another part. The elbow pipe 2 also has a threaded section 4 for connection with the boss 1. The boss has a bore therethrough which is provided with a smooth section 6 adjacent the outer end of the boss and a threaded section 7 which extends inwardly from the smooth section 6. The threaded portion 4 of the pipe is adapted to engage this threaded portion 7 of the boss for the securing of the pipe to the boss.

The boss 1 is also counterbored to form a wall 8 that is spaced away from the smooth wall 9 of the elbow pipe when the elbow pipe is in its set position relative to the boss. The space between the annular wall 8 of the boss and the outer face of the pipe provides a recess for a sealing gasket.

The pipe 2 has a projecting shoulder 10 formed thereon which shoulder is spaced away from the end 11 of the boss. In this space between the shoulder and the end of the boss is a locking collar 12. The shoulder 10 is formed with a cam face. As illustrated in Figures 5 and 6, there are a series of inclined faces. The inclined faces 13 and 14 are oppositely inclined away from the collar. The faces 13' and 15 are oppositely inclined toward the collar. As shown in the drawing, there are four of these inclined faces which constitute the wedging cam surface of the shoulder. The collar 12 has a smooth bore so that it can slide and rotate freely on the smooth section of the pipe. The collar on the face thereof adjacent the shoulder is provided with a similarly shaped cam which cooperates with the cam face on the shoulder. This cam face of the collar has inclined portions 16 and 17 which are shaped and disposed to conform to the inclined faces 13 and 14 of the cam on the shoulder of the pipe. The collar also has four of these inclined faces and the inclined faces 16' and 18 (Figure 8) correspond to the inclined faces 13' and 15 (Figure 6) on the pipe. It is to be understood that these inclined faces are all of similar shape and any pair of opposed faces on the collar and pipe shoulder may cooperate with each other in the locking of the pipe at a set angular position.

The pipe with the collar applied thereto is threaded into the boss until the collar contacts with the smooth end of the boss. At this time the inclined faces are fully engaged. Both the collar and the elbow are backed off until the elbow outlet is placed in the desired set position. Then the collar alone is turned in either direction and as the collar is turned the cam faces sliding one on the other will force the collar into engagement with the end of the boss and the wedging action of the cam faces will lock the pipe in its set position. The cam faces are so dimensioned relative to the threaded connection between the pipe and the boss as to enable the elbow outlet to be backed off to the extent of 360°, if desired, and then the collar turned to effect the locking of the elbow in the desired set position. The gasket is indicated at 19. Said gasket is ring-shaped and is normally circular in cross section. It is dimensioned so that when placed on the smooth section of the pipe it will make a sealing contact therewith. It is also dimensioned so that the normal cross sectional diameter of the gasket is greater than the distance between the walls 2 and 8 but not sufficiently larger but what the collar when pressed against the gasket, will force it into the recess. In other words, no portion of the gasket will be protruded between the collar and the end of the boss and therefore the collar with its smooth surface facing the end of the boss will make contact with a similar smooth surface of the boss. This metal to metal contact between the collar and the boss closes the recess and completely houses the gasket. The gasket is an elastic gasket, preferably of rubber and when it is forced into the recess it is deformed so that it becomes generally elliptical in cross section. The tendency of the gasket to expand to its normal circular shape in cross section will cause the gasket to make tight sealing contact with the walls 2 and 8 of the recess in which the gasket is placed.

The recess is of greater length than the major diameter of the deformed gasket when sealing the joint. Any fluid leaking through the threaded connection between the pipe and the boss and bearing against the gasket will tend to force the gasket into even tighter sealing contact with the parallel walls 8 and 9.

In Figure 9 of the drawing there is shown a slightly modified form of recess for the sealing gasket. Otherwise the parts are similar to those described above and like numerals have been placed thereon. The boss I has the smooth portion 6 and thread 7 for engagement with the thread 4 of the pipe. Instead of providing a counter-bore at the end of the boss, the inner portion of the end is chamfered as indicated at 20. The collar 12 instead of having a flat face extending all the way into the pipe, is likewise chamfered as indicated at 21. When the collar is in contact with the end of the boss there is a triangular-shaped recess provided by the walls of these chamfers 20 and 21 and the outer face of the smooth portion 9 of the pipe. Located in this triangular recess is a gasket 22. The gasket is ring-shaped and is normally circular in cross section. This gasket is dimensioned so that when the collar makes metal to metal contact with the end of the boss the gasket will make a substantial line sealing contact with the outer surface of the pipe and with the walls of the chamfered parts 20 and 21. The gasket should not be so large that any portion thereof will be extruded between the collar and the boss and thus prevent contact between these parts. It may, however, be dimensioned so as to substantially fill the triangular space when the collar contacts with the boss. The positioning of the elbow outlet with this triangular-shaped recess for the gasket is accomplished in the manner above described. The pipe with the gasket and collar assembled thereon is threaded into the boss until the collar contacts therewith and then the pipe and collar are backed off until the elbow outlet is set in the position desired, after which the collar may be turned in either direction and the cam faces will force the collar against the end of the boss and thus lock the pipe in its set position.

While the invention has been shown as applied to the setting of an elbow outlet in a predetermined angular position relative to the boss, it will be understood that the invention may be applied to the connecting of a pipe of any type to a fixed part where it is desired to have a set angular position or a set longitudinal position of the pipe relative to the boss. While the cam members are shown as formed by four sets of inclined faces, it will be understood that more or less inclined faces can be used without departing from the spirit of the invention as set forth in the appended claims.

I claim:

1. A pipe coupling comprising a fixed member having a bore provided with a smooth section at its outer end and a threaded section spaced inwardly therefrom, a pipe having a threaded connection with said fixed member, said pipe having a shoulder spaced away from the end of the fixed member when the parts are connected, and a lock collar on said pipe between the end of the fixed member and said shoulder, said shoulder and collar having cooperating cam faces for forcing the collar against the end of the fixed member for locking the pipe in a set angular position.

2. A pipe coupling comprising a fixed member having a bore provided with a thread, a pipe having a threaded connection with the fixed member, said pipe having a shoulder spaced away from the end of the fixed member when the parts are connected, a lock collar on said pipe between the end of the fixed member and said shoulder, said collar having cam faces thereon and fixed cam faces cooperating therewith, said cam faces being disposed so that the rotation of the collar will lock the pipe in a set angular position.

ARTHUR L. PARKER.